Feb. 26, 1957 W. HUECKING ET AL 2,783,000
MACHINE FOR REELING CONTINUOUS LENGTHS OF MATERIAL
Filed Feb. 23, 1954 4 Sheets-Sheet 1
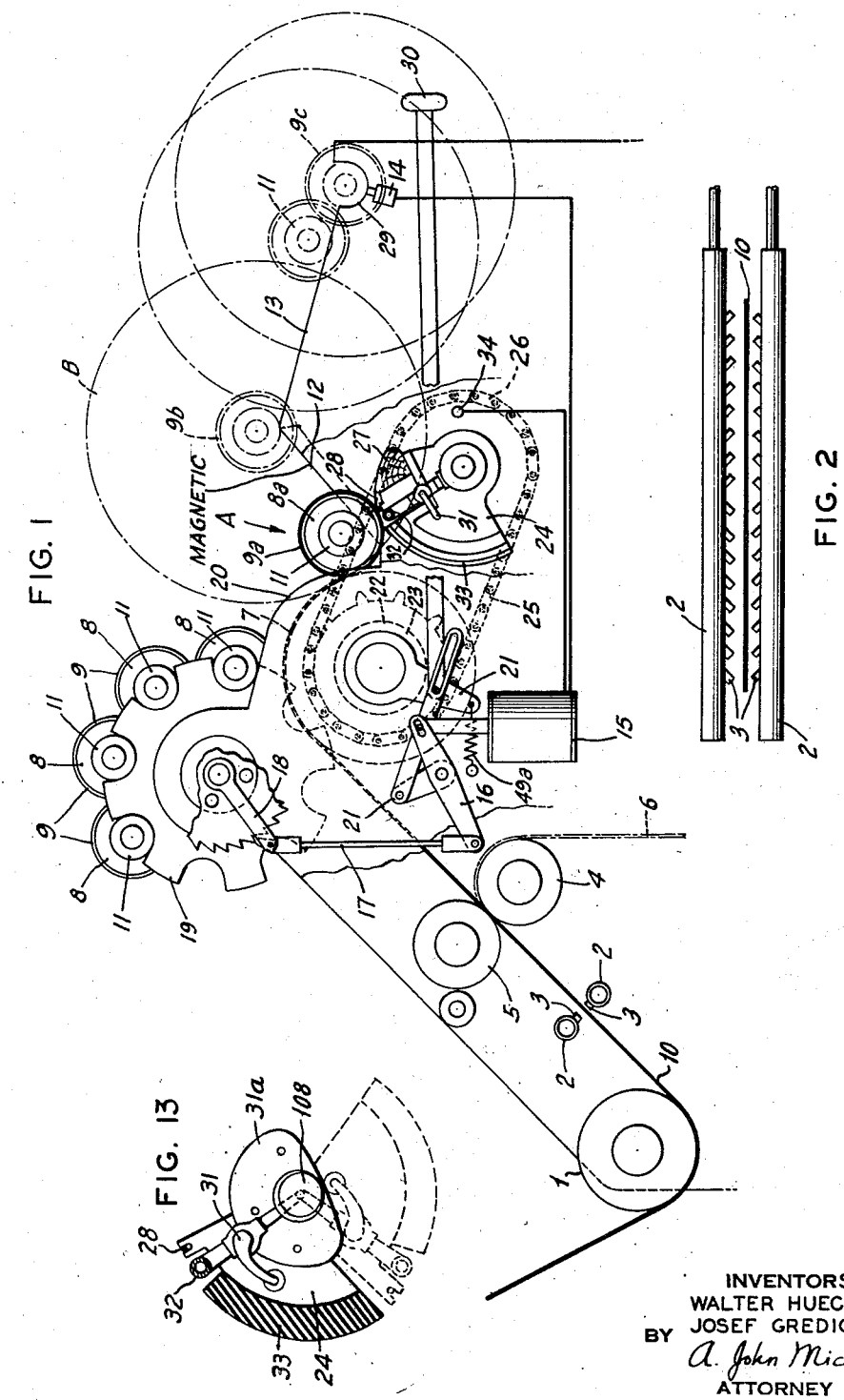
INVENTORS
WALTER HUECKING
JOSEF GREDIGK
BY
A. John Michel
ATTORNEY INVENTORS
WALTER HUECKING
JOSEF GREDIGK
BY *A. John Michel*
ATTORNEY United States Patent Office 2,783,000
Patented Feb. 26, 1957

2,783,000
MACHINE FOR REELING CONTINUOUS LENGTHS OF MATERIAL

Walter Huecking, Dusseldorf, and Josef Gredigk, Unna-Konigsborn, Westphalia, Germany, assignors to Walter Huecking, Dusseldorf, Germany Application February 23, 1954, Serial No. 411,792

Claims priority, application Germany February 25, 1953

14 Claims. (Cl. 242—56)

The present invention relates to methods of and apparatus for the fully automatic reeling of continuous lengths of webs, sheets, films, foils, pellicles and the like of materials such as natural or synthetic plastic material, paper, felt, fabric, etc.

It is a primary object of this invention to provide a completely automatic reeling mechanism wherein a continuous length of material is fed into a machine and a plurality of rolls of reeled-up material may be automatically and successively removed from the machine.

It is a more specific object of the invention to provide an automatic reeling mechanism of the above nature, wherein the formation of wrinkles and buckling of the material during reeling is avoided, time-consuming cutting of the wound lengths of material by hand is eliminated, and the yardage per roll may be automatically controlled, if desired.

If desired, there may be provided means for measuring the reeled-up material, and means for ejecting the measured roll of material. All of said means are arranged to cooperate in a predetermined cycle.

In accordance with one of the preferred features of the invention, the length of material is held under transverse tension by suitable means to keep the material taut widthwise while its edges are trimmed, and the trimmed, tensioned material is supplied to the winding mandrel.

According to another preferred feature, means for applying compressed air to the length of material is arranged on the segmental roller to assure dependable and smooth adherence of the forward end of the length of material to the reeling mandrel.

In accordance with still another feature, the guideway for the winding mandrel may be of permanently magnetic material to hold the mandrel firmly and under even pressure during the reeling operation.

Other objects, advantages and features of the invention will become more apparent in the following detailed description of preferred embodiments thereof, as illustrated in the accompanying drawing, wherein—

Fig. 1 is a schematic side view of a reeling apparatus according to the invention;

Fig. 2 is a schematic front view of the means for applying compressed air to the material to hold it under widthwise tension while it is supplied to the reeling mechanism;

Fig. 13 shows details of the segmental roller with the air valve and cam control means.

Figure 3:
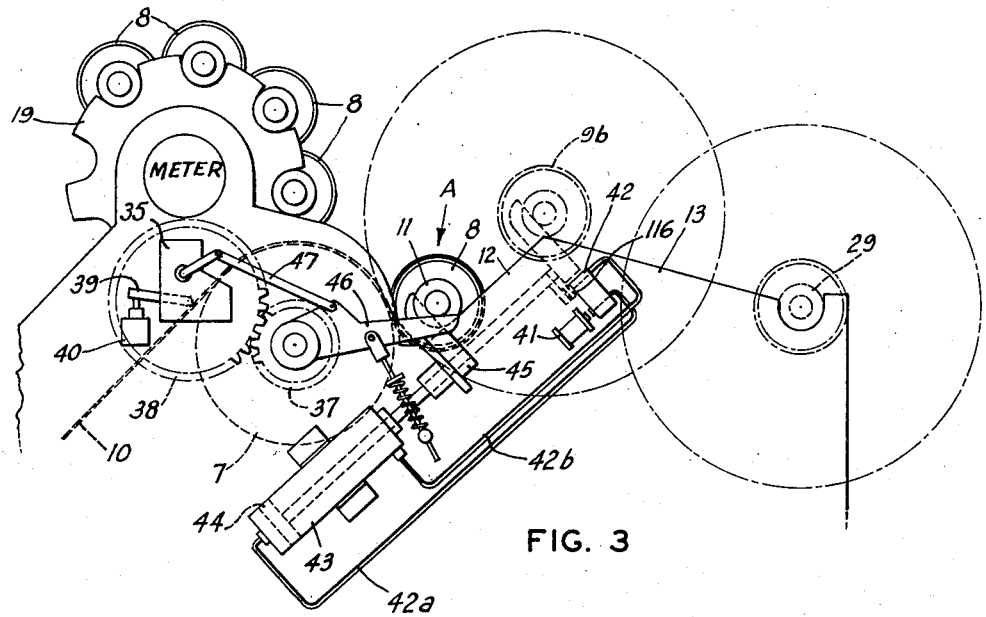
Fig. 3 is a schematic side view showing the measuring means with pneumatic ejecting means for the winding mandrel.

Like reference numerals are applied to like parts of all figures of the drawing, wherein 10 designates a continuous length of material supplied to the reeling apparatus over drum 1.

The first operation on the length of material is performed by the tensioning means which consists of two transverse air supply tubes 2, flanking the surfaces of the material and adjustably arranged in relation thereto. Each tube has two banks of compressed air nozzles or jets 3, the direction of the air issuing from the nozzles in each bank being obliquely away from the tube center and therefore obliquely toward the laterally corresponding tube end. With pressure at from forty-five to ninety pounds per square-inch, the air issuing from each tube is divided into two symmetrically angular, equally wide masses, stretching the two longitudinally extending half-widths of the material away from one another, whereby the formation of longitudinally extending creases, which all too frequently mar thin and particularly soft foils or films of plastic material, is quite effectively precluded, and the foil is therefore prepared for accurate trimming of the two longitudinal margins simultaneously by two pairs of circular knives, two upper knives 5 respectively co-acting with two bottom knives 4, the upper knives being adjustably elevatable for clearance of the material during the commencement of operations, maintenance, adjustment or otherwise. The trimmed edges 6 may be allowed simply to fall down. When the material is one of certain plastic types, such material is salvaged for re-processing.

After the trimming to any selected width, the material is frictionally engaged and transported by the supporting drum 7, whose cylindrical surface is preferably relatively soft, being provided, for instance, with a soft-rubber jacket 7a. Drum 7 is driven by an adjustable friction gear (not shown) to synchronize its speed with the speeds of the other moving parts of the apparatus. From drum 7, material 10 arrives at the winding station A, where it is reeled upon a winding mandrel which comprises a mandrel core 8a and a tube 9a of cardboard or similar material. The mandrel core and tube 8a, 9a are supplied from revolving drum 19 on which are mounted a few identical winding mandrels 8, 9. When it is desired to sever the wound material, segmental roller 24 is rotated from the rest position shown in Fig. 6 to the cutting position shown in Fig. 1, displacement of the roller closing a circuit for heating cutter 28, slip ring 24a serving to establish contact and close the circuit and finger 24b (Fig. 11) breaking the circuit again upon continued rotation of roller 24. At the beginning of each reeling cycle, lever or arm 46 operates pull rod 47 to reset the meter. The two mandrel ends respectively bear two metallic rollers 11, mounted in suitable ball or glide bearings and riding upwardly along the two ways constituting the guideway 12, simultaneously with and in consequence of the gradually augmenting mass of the material that is being wound onto the mandrel and moving upwardly obliquely toward the discharge end of the machine at the right hand side in the views. The weight of the winding mandrel causes it frictionally to engage drum 7 through the material, whereby the mandrel is rotated and the material is reeled thereupon. To avoid any possibility of an oscillating movement of the winding mandrel, guideway 12 is preferably formed of permanently magnetic steel rails which securely hold rollers 11, whereby the mandrel is dependably and under even pressure held against drum 7, even at high rotary speeds.

When a maximum unit of material has been reeled onto the mandrel, the roll diameter being indicated by the dashline circle B, the rollers 11 find themselves at the top of the guideway 12, which is also the entrance to the runway 13, the mandrel, at this stage, being indicated by 9b. The finished roll, but not yet detached from the continuous length of material, descends the runway to the terminal station 29, where the corresponding mandrel position is indicated by 9c. As hereinbelow described in connection with Fig. 3, it is also possible to eject the roll before it has reached its maximum diameter at any predetermined yardage.

Figure 4:
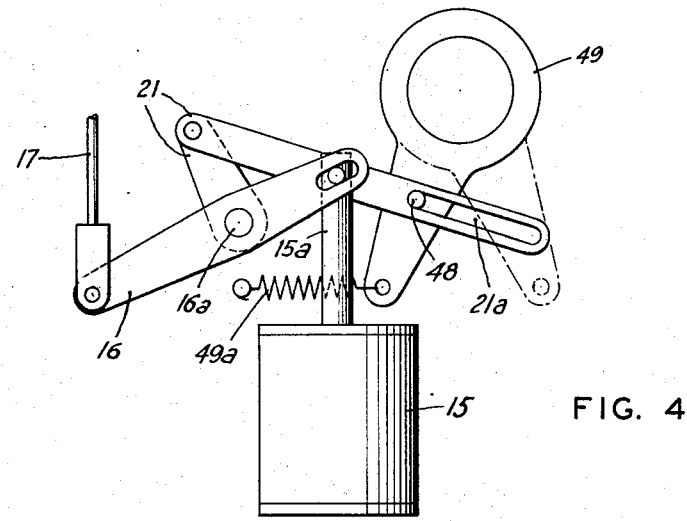
Fig. 4 is a schematic side view of a detail of the apparatus.

When the roll reaches terminal station 29, it contacts and closes switch 14 which actuates solenoid 15. The solenoid core 15a is pivotally connected with and pulls one end of rocker arm 16 which is mounted on rotatable axle 16a, the other end of the rocker arm being hinged to push rod 17, which actuates pawl 18 to rotate revolving drum 19 (clockwise as seen in the drawing) to the next one of its eight stations, equally spaced, and therefore over an angle of forty-five degrees. The revolving drum mounts a few identical winding mandrels 8, 9 which are counterparts respectively of mandrel 8a and tube 9a, hereinabove described. This rotation releases the first available mandrel, which thereupon descends incline 20, riding on the two rollers 11, to winding station A. Simultaneously (see Figs. 4 and 5) friction coupling 22 is operated by action of the hinged bell-crank lever 21, one of whose arms is connected to rotatable axle 16a and thus coacts with rocker arm 16. The other arm of bell crank lever 21 is provided with a slot 21a engaged by a pin 48 mounted on friction coupling actuating member 49. When the reactance coil of solenoid 15 is actuated, core 15a pulls down rocker arm 16, thereby rotating axle 16a in clockwise direction and forcing member 49 into the position shown in Fig. 4 in dotted lines, thus operating friction coupling 22 and sprocket 23.

Figure 5:
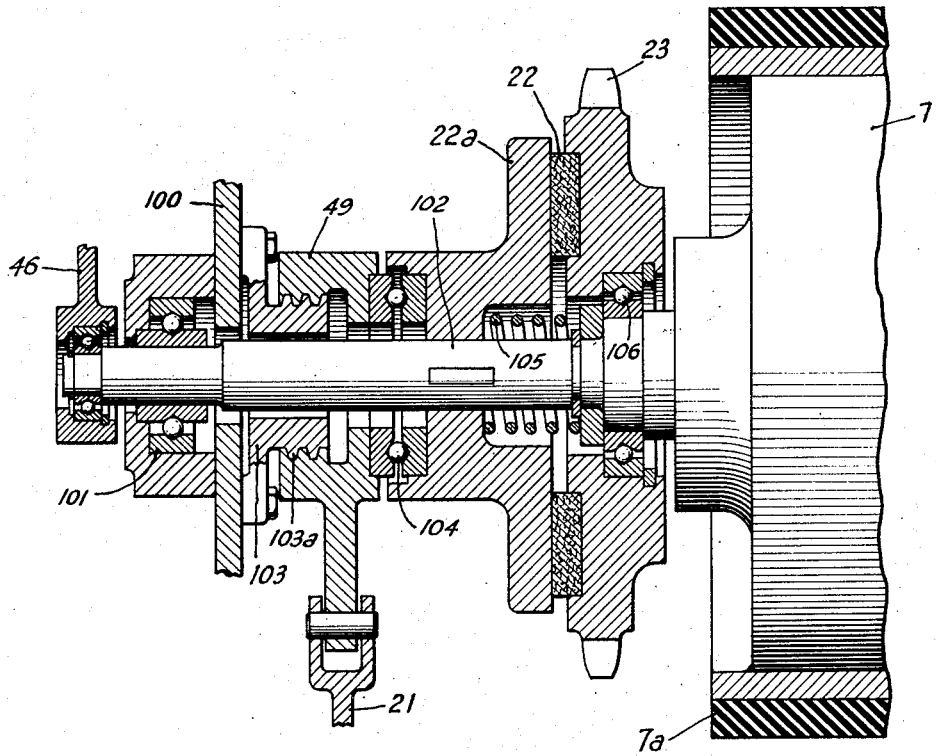
Fig. 5 shows a cross section through the drum bearing means and connected parts of the apparatus.

As shown in Fig. 5, drum 7 is rotatably mounted on machine frame 100 in ball bearings 101. Sleeve 103 having external threads 103a is fixedly mounted on frame 100 and receives drum axle 102. Friction coupling actuating member 49 is threadedly connected with sleeve 103 at 103a and is operatively connected with sleeve support 22a of the friction coupling by means of ball bearings 104. Coil spring 105 tends to disengage friction coupling 22 from sprocket 23 in the absence of positive action of member 49. Sprocket 23 is mounted on axle 102 by means of ball bearings 106.

Figure 6:
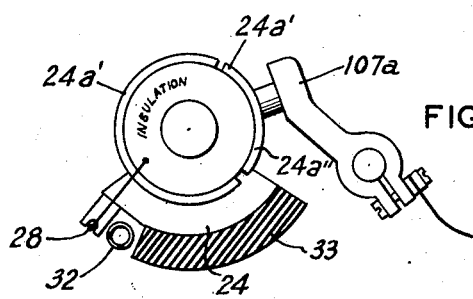
Fig. 6 is a schematic side view showing certain details of the segmental roller of the invention.

Operation of sprocket 23 will also turn sprocket 26 (Fig. 1) by means of chain 25, thus rotating segmental roller 24 in a direction opposite to that of the winding mandrel from the rest position shown in Fig. 6 to the position shown in Figs. 1 and 13. Displacement of the segmental roller closes a circuit for electrically heatable cutter 28, thus heating the cutter and severing the length of material. When severing certain synthetic plastic materials, a temperature of approximately 300° is indicated. If, for any reason, no severance occurs, emergency manual actuation of the segmental roller may be effected by pulling lever 30.

The forward end of the segmental roller is provided with a hardwood cleat 27 (see Fig. 1) for engaging the not yet severed length of material. The schematic side view of Fig. 6 shows the arrangement of the cutting member 28, jet tube 32 (described hereinafter), soft-rubber pad segment 33 and slip rings 24a and 24a', the latter carrying rest contact 24a'' (Fig. 6). When the segmental roller is in its rest position, contact portion 24a'' is in contact with carbon brush 107a. The actuation of segmental roller 24 will be explained hereinafter in connection with Figs. 7–10.

The roll at the terminal station 29 is kept rotating by means of a friction wheel so that the length of material will continue to be wound up on the roll and will be kept under longitudinal tension during severance. The finished roll is removed from station 29 by hand. At the moment of severance, the air valve 31, rotating with the segmental roller, is opened by a suitable, fixed cam 31a and compressed air is released through air jets in tube 32, exactly like the jets 3 in the tensioning means. In Fig. 13, the rest position of the segmental roller, with the air valve closed, is shown in dotted lines. The cam 31a turns a spring-actuated plug valve of the air valve 31 as the segmental roller rotates so that compressed air may flow from tube 32. The air forces the smoothed out advanced end of the material into snug tangency with the winding mandrel, with immediate and definite mutual adherence. The action of the soft-rubber pad 33, alternatively referred to as a resilient pad, whose surface travels at somewhat greater speed than that of the winding mandrel, assures smooth and dependable adherence of the material to the mandrel.

Figure 7:
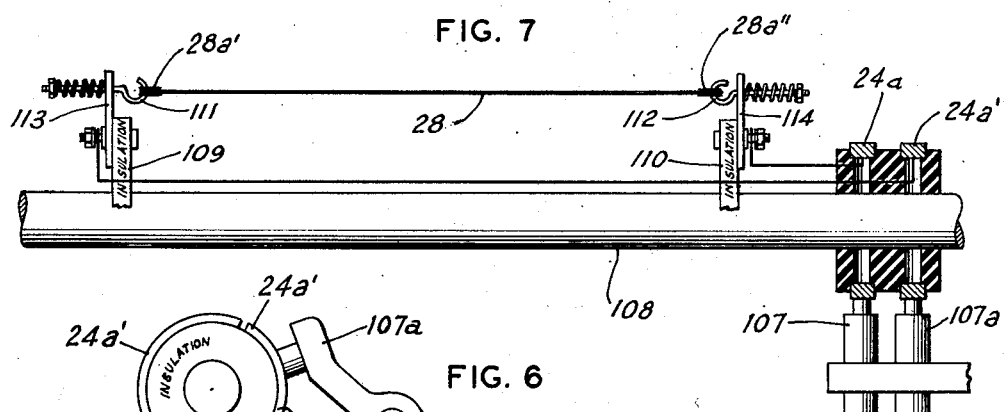
Fig. 7 shows one embodiment of the cutter.
Figure 8:
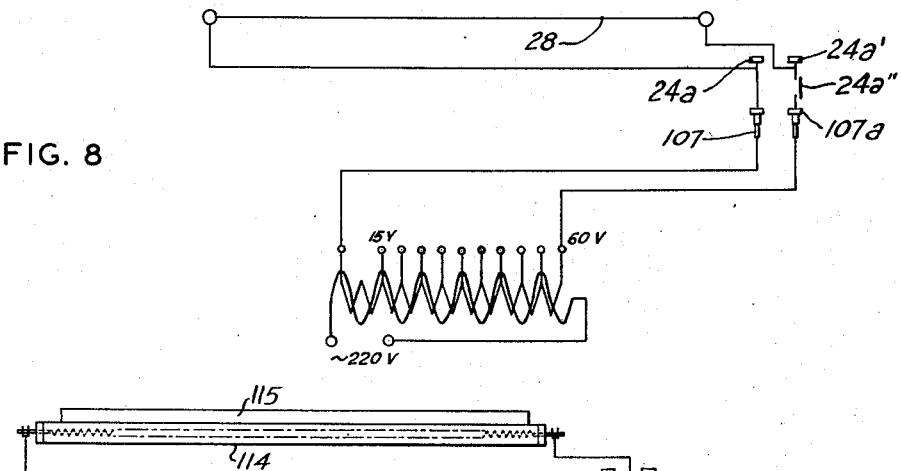
Fig. 8 is a circuit diagram showing the heating means for the cutter.
Figure 10:
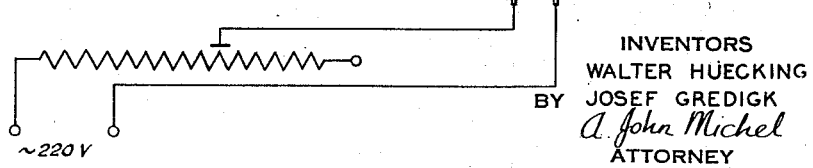
Fig. 10 is a circuit diagram showing the heating means for the cutter of Fig. 9.

Referring now to Figs. 7 and 8, there is shown a preferred embodiment of an instantly heated cutter and the actuating circuit therefor. This type of cutter is used for thin foils. As shown in Fig. 7, a thin resistance wire 28 is mounted on the segmental roller axle 108 by means of insulating supports 109 and 110. Cutting wire 28 has terminal eyes 28a' and 28a'' which engage hook members 111 and 112, respectively, the hooks being yieldably supported in brackets 113 and 114. The segmental roller axle insulatingly supports slip rings 24a' and 24a'' which are adapted to contact carbon brushes 107 and 107a.

Upon closure of the contact, electricity will be fed to wire 28 from a source of voltage which is connected with a low-voltage transformer (see Fig. 8), the circuit from the transformer to carbon brush 107a, slip ring 24a', through cutting wire 28, slip ring 24a, carbon brush 107 and back to the transformer being closed. A source of 220 volts is shown in the drawing and the transformer may be selectively adjusted between 15 and 60 volts, depending on the thickness of the foil to be severed.

Figure 9A:
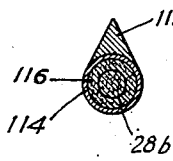
Fig. 9A is a section along line IXA—IXa of Fig. 9.
Figure 9:
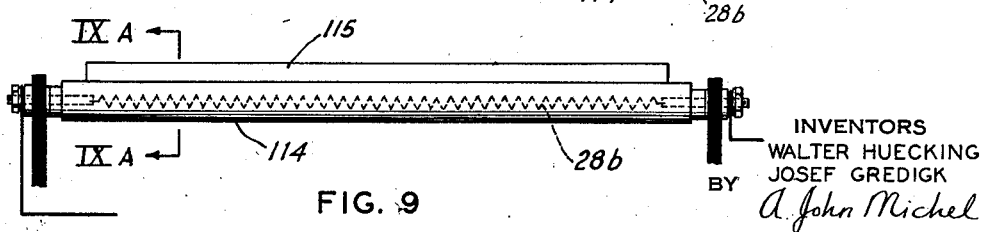
Fig. 9 shows another embodiment of a cutter.

If foils of heavier material are to be severed, the momentary heating of wire 28 may not be sufficient to cut the material and, in this case, use may be made of a cutting member as shown in Figs. 9 and 9A. The general arrangement and circuit connections are similar to those in Figs. 7 and 8, except that a resistance heating coil 28b is mounted in steel tube 114 which is provided with cutting edge 115. Wire coil 28b is embedded in the steel tube in a heat-resistant material 116. In this embodiment, the slip rings have no rest breaking contact and the cutter remains permanently heated, the low-voltage transformer for regulating the temperature being replaced by a grid resistance.

Figure 11:
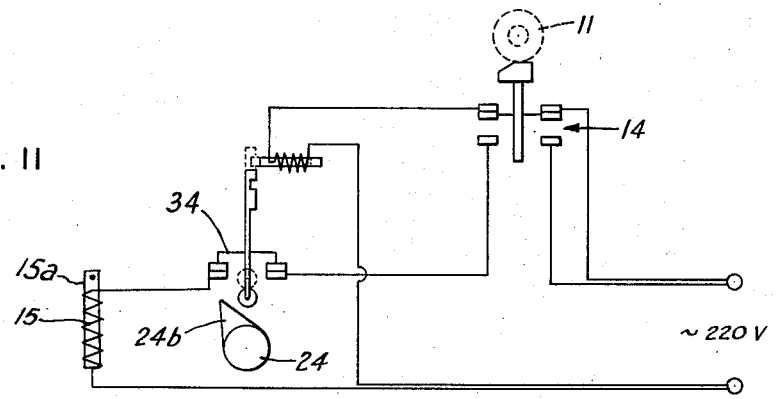
Fig. 11 is a circuit diagram illustrating the operation of the reeling and severing operation.

The operation of the segmental roller and the severance of the length of material becomes evident from the circuit diagram of Fig. 11. A 220 volt source of current feeds electricity to the auxiliary solenoid via throw-over switch 14 while the circuit breaker 34 is free and no current is fed to solenoid 15. When switch 14 is closed by roller 11 of the wound roll in terminal station 29, current from the voltage source is fed to solenoid 15. This causes operation of levers 16 and 21 and subsequent supply of a new winding mandrel to station A as well as rotation of the segmental roller in the manner described hereinabove. Upon continued rotation of the segmental roller, finger 24b will actuate circuit breaker 34 which will be held in operative position by the auxiliary solenoid, thus keeping the circuit for solenoid 15 open and deactivating the solenoid. Tensioned spring coil 49a will force levers 16 and 21 to return to their original position and push rod 17 comes to rest in pawl 18, ready for a subsequent rotation of drum 19. The friction coupling 22 is now disengaged and rotation of the segmental roller ceases. Upon removal of the finished roll from station 29, throw-over switch 14 will again close the circuit to the auxiliary solenoid. By action of the fixed cam, the air valve closes and current heating the cutter 28 no longer flows.

The above-described machine may be built for any maximum size of roll, rolls having a diameter of 200 mm., 300 mm. or 350 mm. being practical for most purposes. Any rotary speed of the winding mandrel may be used, speeds from 3 to 36 meters per minute having been found satisfactory. A motors of from 1.5 to 3 H. P. has been found to provide sufficient power for operation of the machine.

Figure 12:
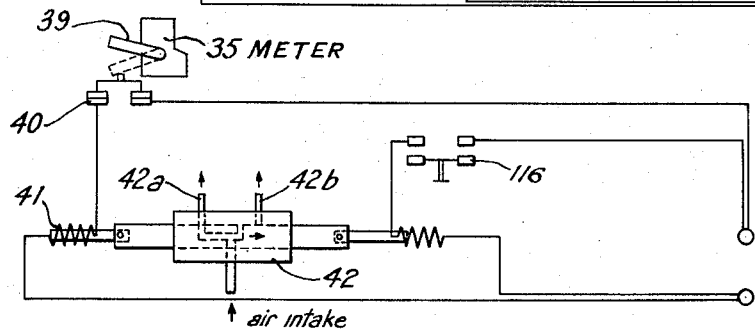
Fig. 12 is a circuit diagram illustrating the operation of the optional measuring means and the pneumatic control means.

Figs. 3 and 12 illustrate the optional measuring means in the reeling apparatus of the present invention. When connected thereto, meter 35 is driven by supporting drum 7 through gears 37 and 38. The meter records the yardage of material passing over drum 7 and can be set for any predetermined length of material. When the set yardage is reached, the meter lever 39 actuates a switch 40 which, through solenoid 41, opens the compressed air control valve 42. The air, entering cylinder 43 through duct 42a under piston 44, actuates ejector 45, which engages roller 11 and thus moves the measured roll of material to the highest point on guideway 12 (position 9b), wherefrom it glides along runway 13 to terminal station 29. When at the highest point of the magnetic guideway, the ejector 45 actuates control valve 42 by closing switch 116, whereupon the air enters cylinder 43 through duct 42b above the piston, thereby forcing it and the ejector into their original position.

When the roll reaches the terminal station, it actuates switch 14, as hereinabove described, thus operating the heated cutting member 28 and causing a new winding mandrel to be placed at the winding station A. On release of the winding mandrel from revolving drum 19, a lever or arm 46 resiliently receives the mandrel, whereby the magnetic guideway does not tend to lose its magnetism by reason of the sudden impact caused by the mandrel weight. Simultaneously, lever 46 operates pull rod 47 to reset the meter or measuring device at the beginning of each reeling cycle.

If it is not desired to measure the yardage of the rolls of material and the size of each roll is determined by its diameter, the ejector means are disconnected and only the total yardage is metered.

The movement of all parts is so synchronized that the position of segmental roller 24 is as illustrated in Fig. 1, when a new winding mandrel is delivered to winding station A.

By employment of the substantially fully automatic method and machine described, continuous lengths of material may be reeled at reduced costs while retaining high reeling quality, without creases or other defects, a troublesome problem which has been challenging the industry for decades, particularly in connection with very sensitive, thin films of material.

While the automatic reeling apparatus has been described in connection with certain now preferred embodiments, it will be understood that changes and modifications of the illustrated structure may occur to the skilled in the art without departing from the spirit and scope of the invenion as defined in the appended claims.

What is claimed is:

1. In an automatic reeling mechanism wherein a continuous length of material is wound upon a winding mandrel: a segmental roller arranged to be rotated into contact with said winding mandrel, the direction of rotation of the roller being opposite to that of the mandrel, and an electrically heatable cutting member carried at the forward end of the segmental roller, said roller having a relatively soft surface adapted to press the length of material smoothly against the winding mandrel.

2. An automatic reeling apparatus for a continuous length of material, comprising, in combination, a winding mandrel, means for supplying the length of material to said mandrel, a segmental roller arranged to be rotated into contact with said mandrel, the direction of rotation of the segmental roller being opposite that of the winding mandrel, an electrically heatable cutting member carried at the forward end of the segmental roller, said segmental roller having a relatively soft surface adapted to press the length of material smoothly against the winding mandrel, a guideway for guiding the mandrel as said length of material is being reeled thereupon, and means for actuating rotation of the segmental roller and electrically heating the cutting member at a predetermined time.

3. An automatic reeling apparatus as defined in claim 2, additionally comprising means for holding the length of material flatly under transverse tension while it is supplied to the winding mandrel.

4. An automatic reeling apparatus as defined in claim 3, wherein said tensioning means comprises means for applying a stream of compressed air to the surface of the material.

5. An automatic reeling apparatus as defined in claim 3, additionally comprising rotating knives for trimming the longitudnal edges of the material in advance of the winding mandrel.

6. An automatic reeling apparatus as defined in claim 2, additionally comprising means arranged on the segmental roller for applying a stream of compressed air to the surface of the material on the winding mandrel when the roller is rotated into contact with said mandrel.

7. An automatic reeling apparatus as defined in claim 2, wherein said guideway comprises two guide rails of permanently magnetic material.

8. An automatic reeling apparatus for a continuous length of material, comprising, in combination, a winding mandrel, means for supplying the length of material to said mandrel, means for applying a stream of compressed air to the surface of the material to hold it under transverse tension while it is supplied to the winding mandrel, means for trimming the longitudinal edges of the material in advance of the mandrel and while held under transverse tension, a segmental roller arranged to be rotated into contact with said mandrel, the direction of rotation of the segmental roller being opposite that of the winding mandrel, an electrically heatable cutting member carried at the forward end of the segmental roller, said roller having a relatively soft surface adapted to press the length of material smoothly against the winding mandrel, means arranged on the segmental roller for applying compressed air to the surface of the material on the winding mandrel when the roller is rotated into contact with said mandrel, a guideway of permanently magnetic material for guiding the mandrel as said length of material is being reeled thereupon, and means for actuating rotation of the segmental roller, the supply of compressed air to the means on the roller, and for electrically heating the cutting member at a predetermined time.

9. An automatic reeling apparatus for a continuous length of material, comprising, in combination, a winding station, a winding mandrel at said station, means for supplying the length of material to said mandral under transverse tension, a segmental roller arranged to be rotated into contact with said mandrel, the direction of rotation of the segmental roller being opposite that of the winding mandrel, an electrically heatable cutting member carried at the forward end of the segmental roller, said segmental roller having a relatively soft surface and carrying means for applying compressed air to the surface of the material on the winding mandrel when the roller is rotated into contact with said mandrel to press the material smoothly against the mandrel, a guideway of permanently magnetic material for guiding the mandrel as said length of material is being reeled thereupon, a metering means connected to the material supply means for measuring the length of material supplied, means for setting the metering means at a predetermined yardage, means connected to the setting means for removing the winding mandrel from the winding station at the set yardage, and means for actuating rotation of the segmental roller and for electrically heating the cutting member at a predetermined time.

10. An automatic reeling apparatus as defined in claim 9, comprising a supply means of additional winding mandrels, means for removing the wound roll of material from the winding station, electrical switch means in the path of said wound roll, said electrical switch means actuating rotation of the segmental roller, causing the closing of a circuit for electrically heating the cutting member and actuating the supply means to move another winding mandrel to the winding station, and means at the winding station and actuated by the winding mandrel arriving thereat for resetting the metering means.

11. An automatic reeling apparatus as defined in claim 9, wherein said means for removing the winding mandrel from the winding station comprises a pneumatically actuatable ejector member, and means for actuating the ejector member when the setting means has reached a predetermined point.

12. An apparatus for reeling a continuous length of material at a winding station, comprising, in combination, means for supplying the length of material to the winding station, said means including a transport and support drum for the material, means arranged in advance of the drum for applying compressed air to the surface of the material to hold it under transverse tension while it moves to the drum, a winding mandrel at the winding station and in frictional contact with the transport drum, supply means holding a supply of additional winding mandrels, an upwardly extending guideway of permanently magnetic material for guiding the mandrel as said length of material is being reeled thereupon, a segmental roller arranged adjacent the winding station and arranged to be rotated into contact with said mandrel, the direction of rotation of the segmental roller being opposite that of the winding mandrel, said roller having a relatively soft surface and carrying means for applying compressed air to the surface of the material on the winding mandrel when the roller is rotated into contact with said mandrel to press the material smoothly and firmly against the mandrel, an electrically heatable cutting member carried at the forward end of the segmental roller, a downwardly extending runway connected to said upwardly extending guideway at its summit and adapted to remove the wound roll of material from the guideway, an electrical switch arranged in said runway and actuated upon contact with the wound roll, a solenoid connected to said switch and actuated by its closing, first mechanical means actuatable by said solenoid for rotating the segmental roller into contact with the winding mandrel, an electrical circuit for said cutting member, means actuated by the rotating segmental roller for closing the circuit and heating the cutting member, second mechanical means actuatable by said solenoid for actuating the supply means of additional winding mandrels and to supply an additional mandrel to the winding station, and a circuit breaker in the path of the rotating segmental roller for deactivating the solenoid.

13. An apparatus as defined in claim 12, wherein said supply for additional winding mandrels is a revolving drum, said second mechanical means comprises a two-armed lever actuated by the solenoid and connected to a means for rotating the drum over a predetermined angle, the first mechanical means being also mechanically connected to the lever and being actuated by its movement.

14. An apparatus as defined in claim 12, comprising a meter connected to said transport and support drum for measuring the length of material transported thereover, lever means for setting the meter at a predetermined yardage, an electrical switch in the path of said lever means and closed thereby when the set yardage has been reached, a solenoid actuatable by said switch, pneumatic means controlled by said solenoid, an ejector member movable by said pneumatic means and adapted to move the winding mandrel from the winding station and unto the downwardly extending runway, a resiliently mounted arm arranged at the winding station for resiliently receiving the additional winding mandrel supplied thereto, and means connected to said arm and adapted to reset the setting means when the arm is contacted by the additional winding mandrel.

References Cited in the file of this patent
UNITED STATES PATENTS

| | | |
|---|---|---|
| 535,326 | Farnsworth | Mar. 5, 1895 |
| 817,426 | Harris | Apr. 10, 1906 |
| 1,369,124 | Pope | Feb. 22, 1921 |
| 1,966,525 | Schultz et al. | July 17, 1934 |
| 2,006,499 | Fourness et al. | July 2, 1935 |
| 2,393,243 | Franz | Jan. 22, 1946 |
| 2,681,771 | Haskell | June 2, 1954 |